United States Patent [19]

Miller

[11] 4,326,432
[45] Apr. 27, 1982

[54] FLOOR MOUNTED TRANSMISSION SHIFT CONSOLE

[75] Inventor: Douglas A. Miller, Grand Ledge, Mich.

[73] Assignee: General Motors Corporation, Detroit, Mich.

[21] Appl. No.: 141,190

[22] Filed: Apr. 17, 1980

[51] Int. Cl.³ .......................... G05G 7/00; G05G 5/18; E05B 65/12

[52] U.S. Cl. ......................................... 74/475; 70/195; 70/239; 70/248; 70/252; 74/473 R; 180/287; 192/4 A

[58] Field of Search ............... 74/473 R, 475; 70/194, 70/195, 201, 202, 238, 239, 248, 252, 254; 192/4 A; 180/287

[56] References Cited

U.S. PATENT DOCUMENTS

| | | | |
|---|---|---|---|
| 3,043,403 | 7/1962 | Kelley | 192/4 A X |
| 3,292,450 | 12/1966 | Hurst et al. | 74/473 |
| 3,364,779 | 1/1968 | Cambria | 74/473 |
| 4,235,123 | 11/1980 | Simancik et al. | 74/475 |

Primary Examiner—Allan D. Herrmann
Attorney, Agent, or Firm—Donald F. Scherer

[57] ABSTRACT

A floor mounted shift console for an automatic transmission has a straight-line pattern for the conventional "P R N D I L" pattern and a modified "H" pattern for a 1-2-3 shift sequence. The manual shift lever is biased into an operating position with the yoke of a primary carrier during the straight-line pattern in all positions except "L". A blocker portion on the console prevents changing from the straight-line pattern to the modified "H" pattern except from "L", but permits a change from 2nd or 3rd in the modified "H" pattern to "I" or "D", respectively. A secondary carrier, cam and lever move the transmission control output cable, which is connected to the primary carrier, in a straight line during movement of the manual shift lever to the 2nd and 3rd positions of the modified "H" pattern. A link mechanism for locking the shift console in "Park" is also provided.

3 Claims, 10 Drawing Figures

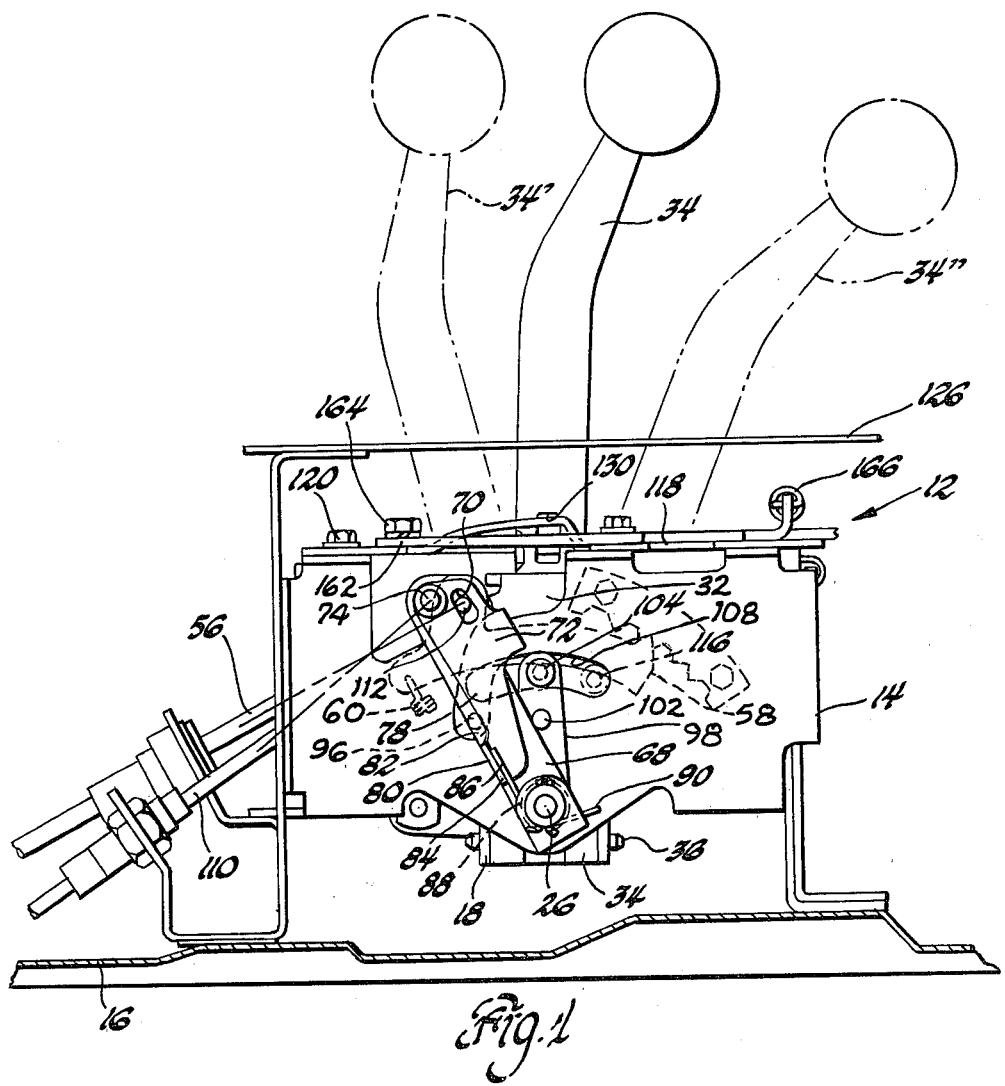
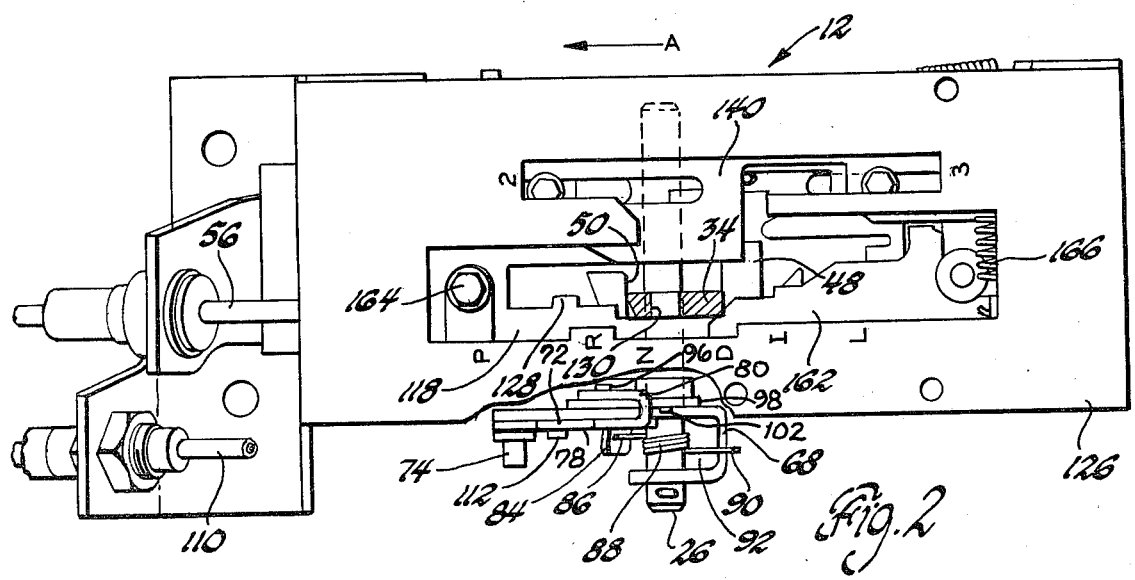

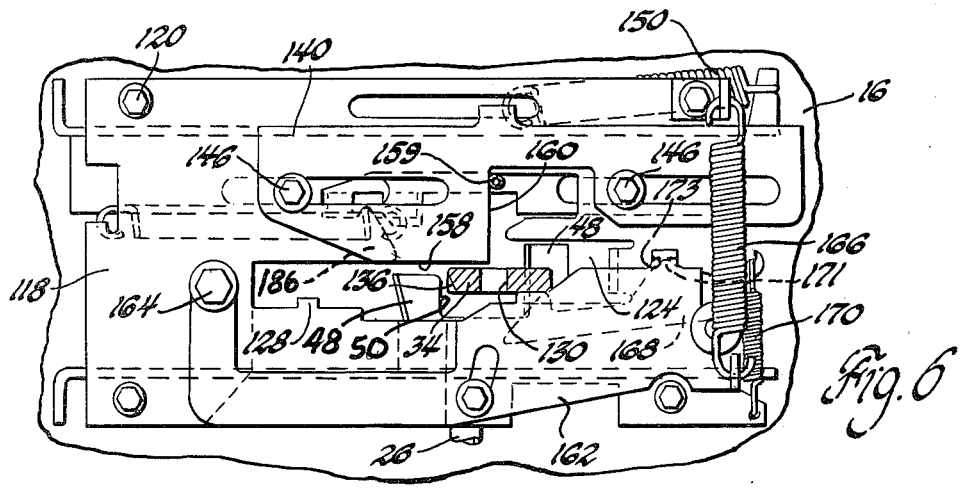
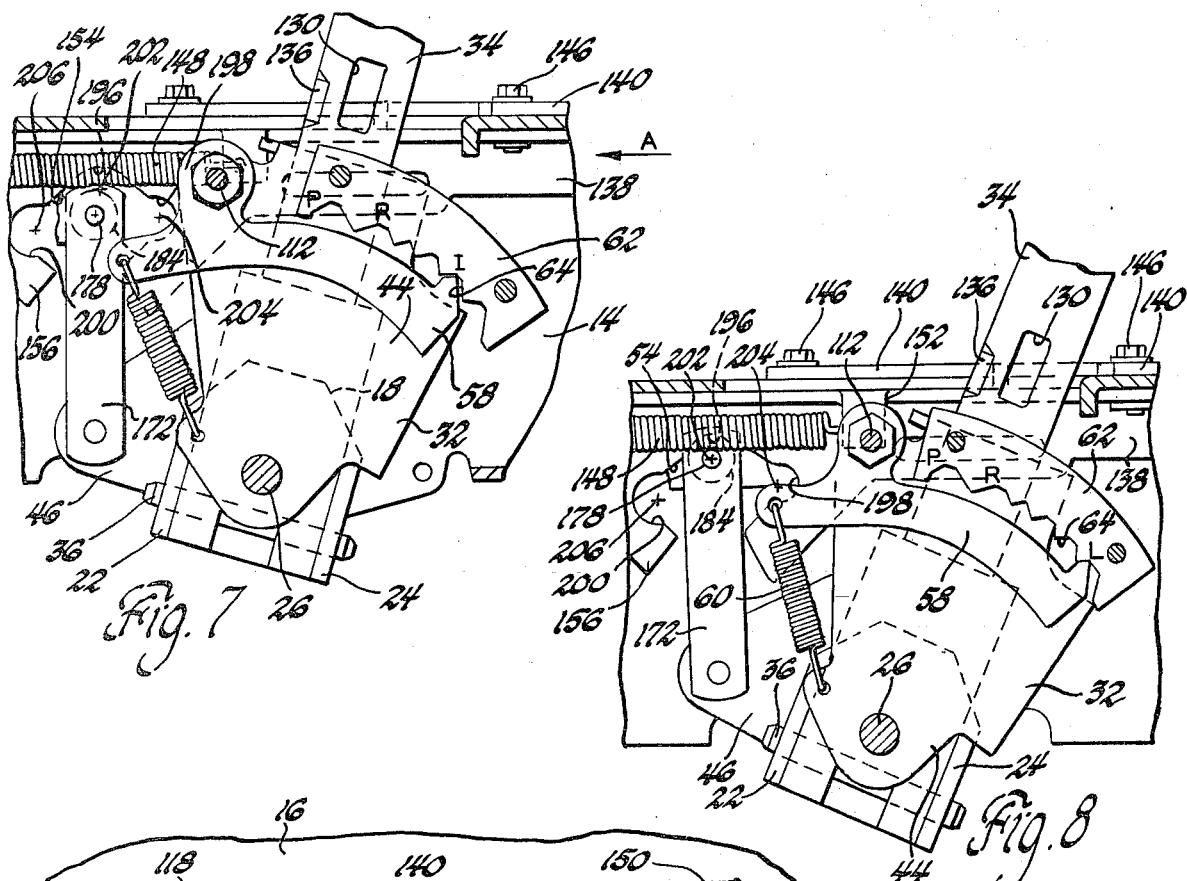
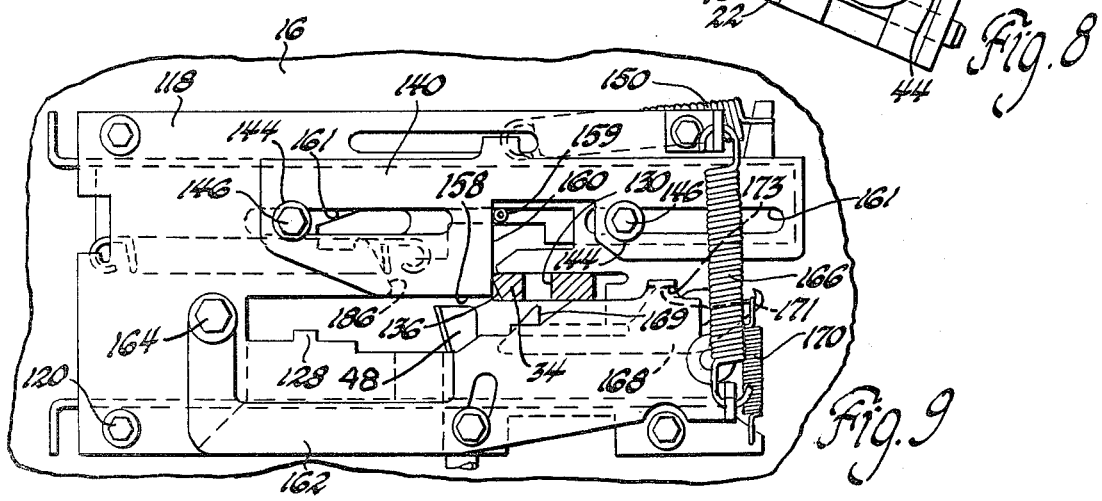

FLOOR MOUNTED TRANSMISSION SHIFT CONSOLE

This invention relates to shift consoles for automatic transmission and more particularly to such consoles which permit both automatic and manual control of transmission operation.

Prior art shift consoles, such as that shown in U.S. Pat. No. 3,292,450 to Hurst et al. issued Dec. 20, 1966, provide for both automatic selection and manual selection of transmission operation. Such devices have a straight-line pattern over the conventional "P R N D L" sequence, and they also have a straight-line pattern for the 1-2-3 manual control shift pattern. In such devices, the manual shift lever is merely displaced axially on its control shaft while it is pivoted to the same position for either automatic or manual selection. That is to say, 3rd gear selection is axially aligned with the "D" selection while 1st gear selection is aligned with "L" and 2nd gear is intermediate these positions and aligned with the "I" position. It should be noted in the Hurst et al. patent that to change from the automatic shift pattern to the manual shift pattern and vice versa, the manual lever must be moved through the neutral (N) position. Another example of a similar shift control device is U.S. Pat. No. 3,364,779 to Cambria, issued Jan. 23, 1968.

The present invention provides a shift console for an automatic transmission which is mounted on the floor adjacent the vehicle operator. This console permits the operator to manipulate the manual shift lever in a straight-line pattern to achieve the automatic drive positions. Should the operator desire to manually manipulate the shift lever for controlling shifting in the modified "H" pattern, which pattern is generally associated with manual transmissions, such maneuvering can be accomplished with the present invention.

This is accomplished by physically disengaging the manual lever from the primary output of the shift console during the modified "H" pattern. During this modified "H" pattern, the output of the shift console is driven by a cam and linkage mechanism which drives the primary output of the shift console in a straight line.

It is an object of this invention to provide an improved shift console which will permit both automatic shift selection in a straight-line pattern and a manual shift selection in a modified "H" pattern.

It is another object of this invention to provide an improved shift console in which a primary carrier, connected to the transmission, is driven by a manual shift lever operating in a straight-line pattern to permit the selection of various automatic drive conditions, and wherein the primary carrier is driven by the manual shift lever through a secondary carrier, cam and linkage mechanism during manual selection of the forward drive ratios in a modified "H" position.

These and other objects and advantages of the present invention will be more apparent from the following description and drawings in which:

FIG. 1 is a side elevational view of a transmission shift console;

FIG. 2 is a top view of a transmission shift console with the manual lever in the neutral (N) position;

FIG. 6 is a view similar to FIG. 4 with the shift lever in the intermediate (I) position;

FIG. 7 is a view similar to FIG. 3 with the shift lever in the intermediate (I) position;

FIG. 8 is a view similar to FIG. 3 with the shift lever in the low (L) position;

FIG. 9 is a view similar to FIG. 4 with the manual lever in the low (L) position.

Figure 10:
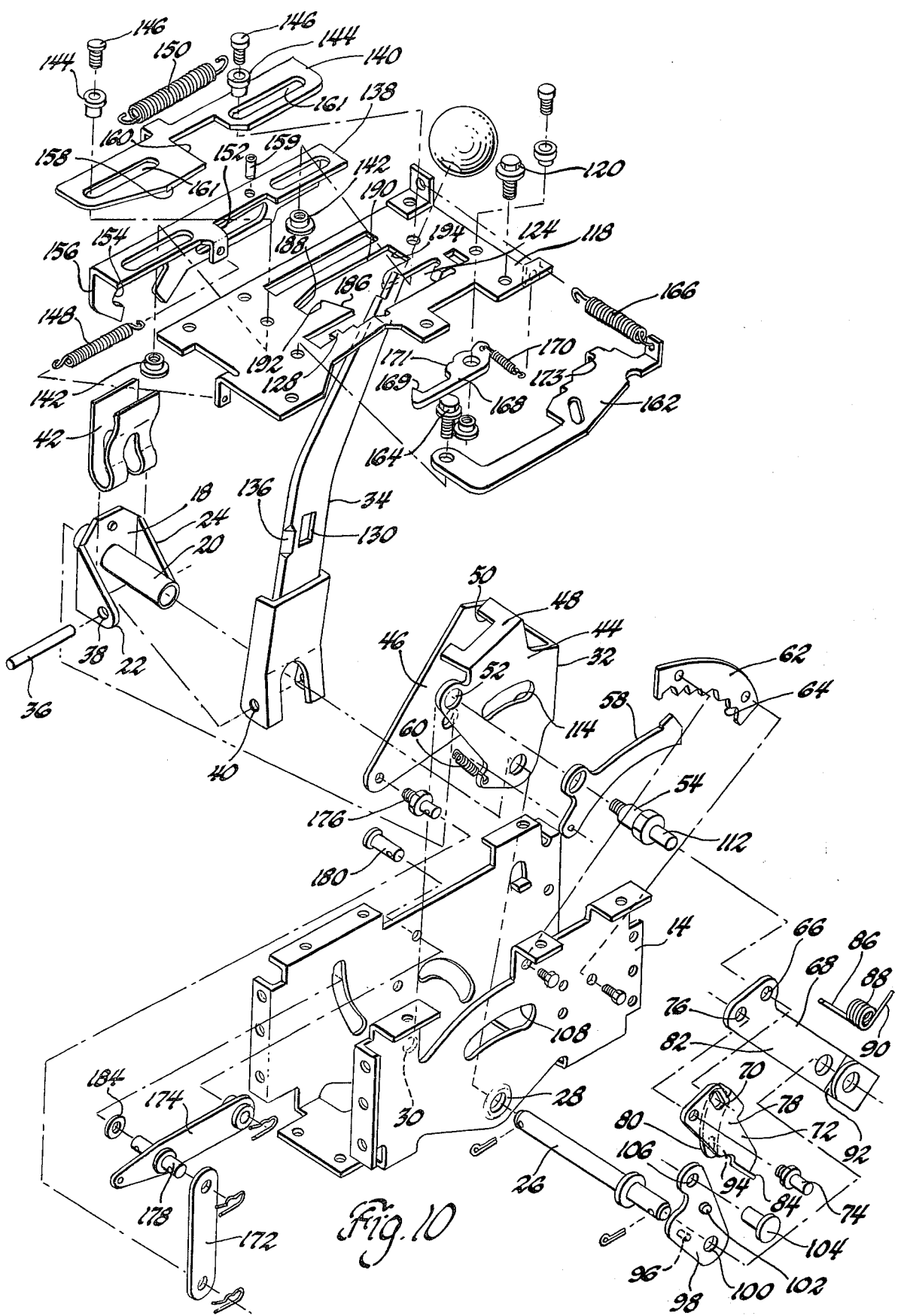
FIG. 10 is an exploded perspective view of the shift console assembly.

Referring to the drawings, wherein like characters represent the same or corresponding parts throughout the several views, and particularly as seen in FIGS. 1 and 10, a shift console, generally designated 12, having a housing 14 which is secured to an automobile floor member 16. A shift lever support 18 has a tubular portion 20 and a pair of arm members 22 and 24. The tubular portion 20 is rotatably disposed on a pin 26 which passes through apertures 28 and 30 formed in the housing 14. Also mounted on the pin 26 is a primary shift carrier 32. A manual shift lever 34 is pivotally mounted to the shift lever support by a pin 36 which passes through a pair of apertures 38 in the support 18 and a pair of apertures 40 in the shift lever 34. A spring member 42 is disposed between one side of the shift lever support 18 and a manual lever 34 such that the manual lever 34 is urged to pivot about the pin 36 in a clockwise direction when viewed from the forward end of the shift console 12.

The primary carrier 32 has a pair of side surfaces 44 and 46 which extend substantially parallel to the side walls of the housing 14. The side wall 44 has projecting inwardly therefrom a primary shift yoke 48 having an opening 50 which is adapted to receive the manual shift lever 34 when it is urged into engagement with yoke 48 by the spring 42. The side wall 44 has an aperture 52 in which is secured a shift cable pin 54 which is adapted to be connected to a conventional flexible cable, such as that shown at 56, in FIGS. 1 and 2.

Figure 3:
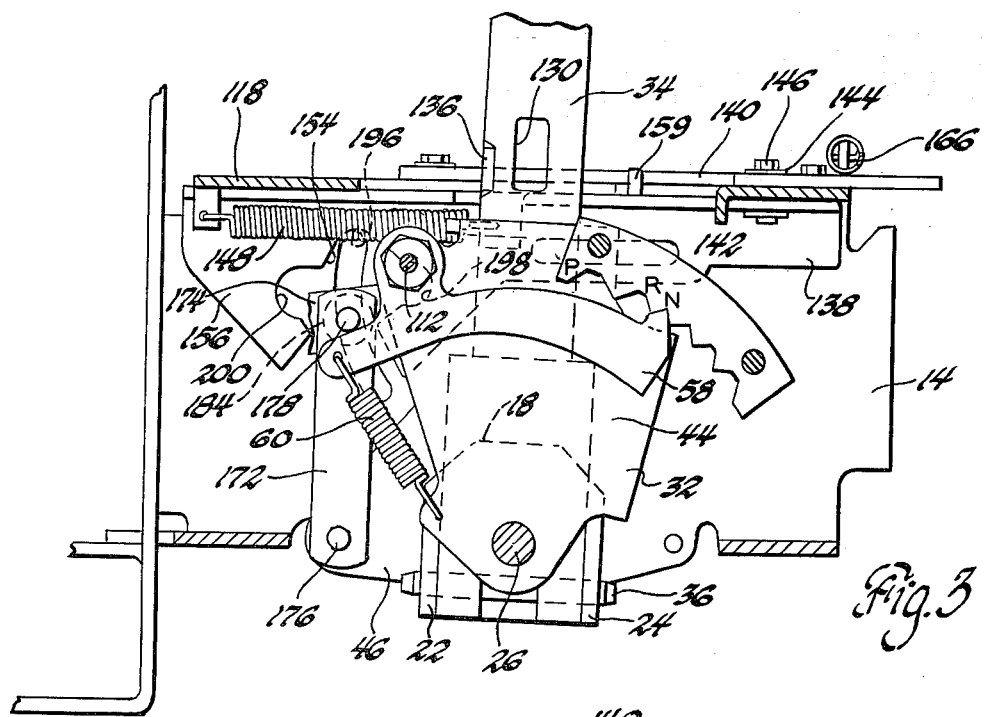
FIG. 3 is a side elevational view of the transmission shift console with a portion of the housing removed.

The pin 54 has pivotally mounted thereon a detent lever 58 which is urged in the counterclockwise direction, as viewed in FIG. 3, by a tension spring 60, such that the detent lever 58 is urged into abutment with a detent plate 62 which has formed therein a plurality of detent or stop positions, such as 64. The detent mechanism including lever 58, spring 60 and plate 62, can best be seen in FIGS. 3, 5, 7 and 8. In FIG. 3, the detent is in the "N" or neutral position, in FIG. 5, the detent is in the "D" or drive position, in FIG. 7, the detent is in the "I" or intermediate position, and in FIG. 8, the detent is in the "L" or low position. The two remaining positions are reverse (R) and park (P).

In FIG. 1, the manual shift lever 34 is shown in phantom line at 34' in the (P) position and in phantom line 34" in the (L) position. Thus, in FIG. 1, the full extent of the pivotal movement of manual lever 34 during the straight-line automatic drive selection is seen.

The shift cable pin 54 also passes through an aperture 66 on a park/lock lever 68 and an elongated aperture 70 formed on a park/lock link 72. The park/lock lever 68 is pivotally mounted on pin 26 while the park/lock link 72 is pivotally mounted by a park cable pin 74 to the park/lock lever 68 through an aperture 76.

The park/lock link 72 has a pair of side walls 78 and 80 which are spaced on either side of the upstanding leg 82 of the park/lock lever 68. The side wall 78 has an outwardly extending tab 84 which is abutted by an arm 86 of a torsion spring 88. The torsion spring 88 has a second arm 90 which abuts a surface 92 formed on the park/lock lever 68. The spring 88 thus urges the park-/lock link 72 in a clockwise direction about pin 74 when viewed in FIG. 1.

The side wall 80 has an elongated aperture 94 in which is disposed a protuberance 96 formed on a park-/lock detent link 98. The link 98 is pivotally mounted through aperture 100 on the pin 26. Since the link 98 has an operating connection with link 72 through elongated aperture 94, the link 98 is urged in a counterclockwise direction about pin 26 when viewed in FIG. 1. A second protuberance 102 formed on the link 98 abuts the lever 68 to limit the counterclockwise movement of link 98 and thereby limit the clockwise movement of the link 72.

A locking pin 104 passes through an aperture 106, formed in link 98, an arcuate aperture 108, formed in the side wall of housing 14, and an arcuate aperture 114, formed in carrier 32. The pin 74 is operatively connected to a conventional flexible cable 110, shown in FIGS. 1 and 2, which is connected in a conventional manner with a steering column shift lock mechanism. The steering column lock mechanism may be any of the currently available well-known designs. For purposes of this disclosure, it is sufficient to recognize that such mechanisms lock the steering column and thereby prevent linear movement of the cable connected thereto. Thus, when the steering column is locked, the pin 74 will be held stationary by the cable 110.

The aperture 66 is slightly larger than the outer diameter 112 of pin 54 such that relative movement of the pin 54 and the lever 68 can occur. The elongated aperture 70 has approximately the same width as the diameter 112 such that movement of manual lever 34 will result in movement of link 72. When cable 110 is locked, however, the movement of link 72 will be pivotal about pin 74. The pivotal movement of link 72 is transmitted to link 98 through the connection at 94 and 96. Due to the difference in radii about which the respective links 72 and 98 move, the movement of limit 98 is also multiplied. Thus, for a small angular movement of link 72, a large annular movement of link 98 occurs. The link 98 is pivoted until the pin 104 reaches the end of the arcuate aperture 114 formed in the side wall 44 of the primary carrier 32.

Simultaneous with the pivoting of link 72, the slight manual lever movement also causes pivoting of detent lever 58 due to its engagement with detent plate 62. With the pin 104 in the dash position 116, as shown in FIG. 1, the detent lever 58 cannot pivot sufficiently to become disengaged from the detent plate 62 thereby preventing further movement of the manual lever 34. Thus, when the transmission is conditioned for park (P) and the steering column is locked, the transmission manual lever cannot be forced from the park position and any attempt to force the manual lever from park is absorbed directly by the housing structure and is not transmitted to the cable 110. Thus, the normal manufacturing tolerances of the cable do not affect the park pull-out maneuver when the steering column is locked.

The manual lever 34 extends through a shift gate plate 118 which is secured by a plurality of fasteners such as 120 to the housing 14. The plate 118 has an opening 124 which accommodates the straight-line automatic drive selection from (P) to (L) as seen on the indicia or cover plate 126 in FIG. 2. The plate 118 has an inwardly extending member 128 which is adapted to engage a rectangular opening 130 formed in the shift lever 34 to provide a part detent mechanism. To move the manual lever from the park position, the operator must pivot the lever 34 against the spring 42 to cause separation between the member 128 and opening 130.

A secondary carrier 138 and a return plate 140 are slidably disposed on the plate 118 by pairs of bushings 142 and 144, respectively. These bushings 142 and 144 are held in position on plate 118 by fasteners 146. A tension spring 148 is connected between the plate 118 and carrier 138 to urge the carrier in a forward direction (toward the (P) position). Forward movement of the carrier 138 is limited by a pin 159 which bears against U-shaped opening 160 formed in return plate 140. A spring 150, which exerts a greater force than does spring 148, is connected between return plate 140 and housing 14 to urge the plate 140 rearwardly (toward the (L) position). The carrier 138 has a U-shaped opening or yoke 152 which is adapted to engage the manual lever 34 when manually shifting to 2nd and 3rd as will be discussed later. The carrier 138 also has a cam surface 154 formed in a downwardly depending side wall 156.

Figure 4:
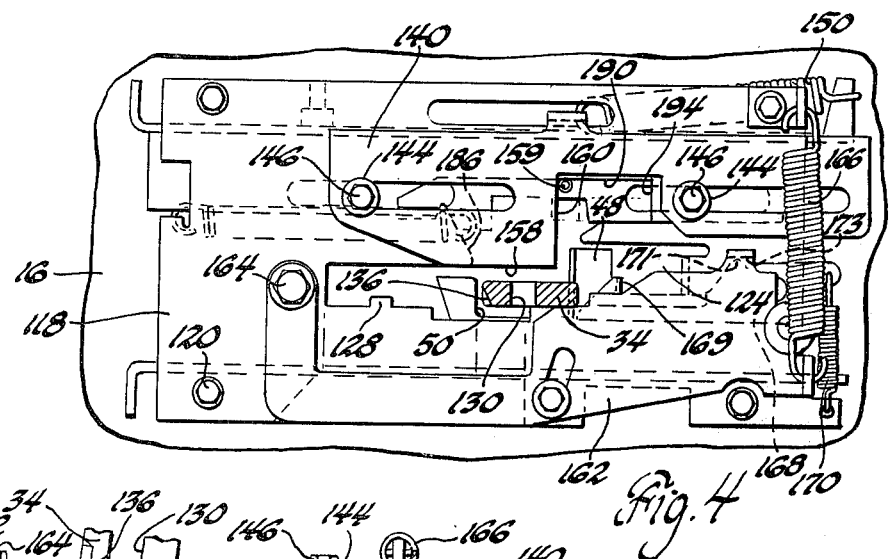
FIG. 4 is a top view of the transmission shift console with the cover plate removed and the transmission in drive (D) position.

The return plate 140 has a blocker surface 159 which, as can be seen in FIGS. 4 and 6, prevents pivoting of the manual lever 34 when the lever is in the drive (D) or intermediate (I) position. However, as seen in FIG. 9, movement of the return plate 140 is limited by the bushings 144 in elongated apertures 161 such that the manual shift lever 34 is aligned with a U-shaped opening 160 formed in the return plate 140.

The manual shift lever 34, when in the low (L) position, is urged into the U-shaped opening 160 by a ramp plate 162 which is pivotally mounted to plate 118 through a fastener 164. The ramp plate 162 is urged in a counterclockwise direction about fastener 164 by a tension spring 166. The spring 166 exerts a greater force on lever 34 than does spring 42. The ramp plate requires the operator to manipulate a manual shift lever against the tension spring 166 if it is desired to move the manual lever from the low (L) position to any of the other automatic drive position along opening 124. A lockout pawl 168 is pivotally mounted on the plate 118 and spring-loaded by a tension spring 170 so that a latch portion 169 will engage with the opening 130 when the manual lever 34 is manipulated against the tension spring 166. The manual lever 34 must move ramp plate surface 173 sufficiently to engage surface 171 to enforce pivoting of pawl 168 before movement from the low (L) to intermediate (I) or drive (D) positions can be accomplished.

A link 172 is pivotally connected between side surface 46 of carrier 32 and a lever 174 by pins 176 and 178, respectively. The lever 174 is pivotally mounted on the housing 14 by a pin 180. The pin 178 also has mounted thereon a cam roller 184 which cooperates with the cam surface 154 formed in the secondary carrier side wall 156.

When the manual lever 34 is urged to pivot about pin 36 by ramp plate 162, it is disengaged from the yoke 48 of primary carrier 32. The manual lever under this condition, may then be pivoted about pin 26 in a forward direction (see Arrow A) until the ramp surface 136 on manual lever 34 engages a ramp surface 186 formed on the plate 118. When this position has been reached, continued forward movement urges the manual lever to pivot on pin 36 against spring 42 and also further pivot about pin 26 until it engages the end 188 of an opening 190 formed in the plate 118. In this position, the manual lever is in the 2nd and gear position. The ramp surface 186 has a detent portion 192, which through the cooperation of spring 42 and rectangular opening 130 will maintain the manual shift lever 34 in 2nd unless the lever 34 is given enough sideward force to disengage the detent. From the 2nd gear position, the manual lever 34 may be pivoted about pin 26 until it reaches the end wall 194 of opening 190. This is the 3rd gear position for the manual shift lever 34.

Figure 5:
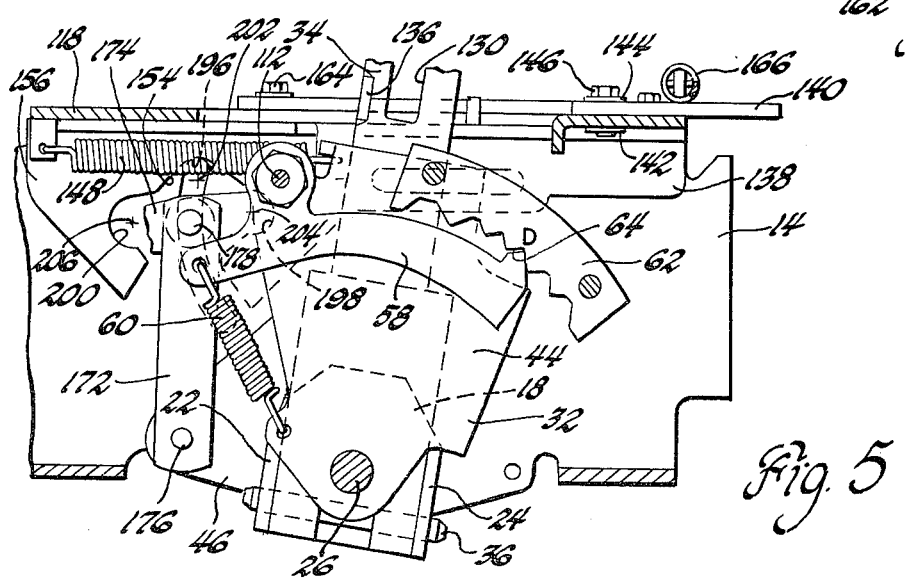
FIG. 5 is a view similar to FIG. 3 with the shift lever shown in the drive (D) position.

As can best be seen in FIGS. 3, 5, 7 and 8, the cam surface 154 includes a low gear surface 196, a 2nd gear surface 198 and a 3rd gear surface 200. The surfaces 196, 198 and 200 are substantially circular such that they have respective centerlines designated 202, 204 and 206. As can be seen in FIG. 8, the centerline of cam roller 184 coincides with the centerline 202 of surface 196 when the manual lever 34 is in the low (L) position. As seen in FIG. 7, the centerline of cam roller 184 is aligned with the centerline of surface 198 when the manual shift lever 34 is in the intermediate (I) position and as seen in FIG. 5, the centerline of cam roller 184 is aligned with the centerline of surface 200 when the manual lever 34 is in the drive (D) position.

Upon movement of the manual lever 34 from the lower (L) or 1st position to the 2nd gear position, the manual lever will engage the yoke 152 of carrier 138. Movement to the 2nd gear position will cause the carrier 138 to move in the direction of Arrow A such that the cam surface between surfaces 196 and 198 will cause the link 172 to move vertically downward thereby pivoting the primary carrier 32 about pin 26 so that the intermediate (I) position is achieved and the transmission will be conditioned for 2nd gear. Upon movement of the manual lever from the 2nd gear position to the 3rd gear position, the cam roller 184 will be moved to coincide with surface 200 such that further downward vertical movement of the link 172 will occur thereby resulting in pivotal movement of the primary carrier 32 about pin 26 until the drive (D) position is reached and 3rd gear operation is accomplished.

The primary carrier 32 is thus positioned either directly by the manual lever 34 during straight-line operation or through the cooperation of link 172, lever 174, cam surface 154 and the secondary carrier 138, during modified "H" pattern shifting. The yoke 48 of the primary carrier 32 will always be positioned to accept the manual lever upon its return from the modified "H" pattern to the straight-line pattern at whatever drive position was last set by the operator. That is, the manual lever can be moved from 3rd gear position to drive (D) or from 2nd gear position to intermediate (I). The opposite maneuver cannot be accomplished. That is, movement from drive (D) to 3rd gear position cannot be accomplished as this is prevented by the blocker surface 158 formed on the return plate 140. For the same reason, movement of the intermediate (I) position to 2nd gear position cannot be accomplished. Thus, to change from the straight-line pattern to the modified "H" pattern, low (L) gear must first be engaged manually.

As previously explained, when low (L) gear is selected, the ramp plate 162 urges the manual lever 34 out of engagement with yoke 48 and conditions the manual lever for movement into the modified "H" pattern.

From the above description, it is obvious that the operator does not have to move the lever through the neutral (N) position when changing from the straight-line pattern to the manual shifting modified "H" pattern.

The embodiments of the invention in which an exclusive property or privilege is claimed are defined as follows:

1. A floor mounted transmission shift console for permitting selection of automatic drive ranges including Park (P), Reverse (R), Drive (D), Intermediate (I) and Low (L) in a straight-line movement and for permitting manual shifting to drive ratios including Low, 2nd and 3rd in a modified "H" pattern, said console comprising a stationary base member; a manual lever pivotally mounted on said stationary base member; primary carrier means pivotally mounted on said base member and including a yoke portion which is selectively engageable with said manual lever; transmission control cable means secured to said primary carrier for transmitting control movements to a transmission; secondary carrier means slidably mounted on the base member and including a yoke portion selectively engageable by said manual lever member; link means operatively connected between said secondary carrier and said primary carrier for transmitting and translating linear movement of said secondary carrier to pivotal movement in said primary carrier, cam means formed on said secondary carrier and operating on said link means for moving said primary carrier to the Intermediate (I) range position when the 2nd ratio is selected by positioning the manual lever in one upstanding leg of the "H" pattern and for further moving the primary carrier to the Drive (D) range position when 3rd ratio is selected; said lever undergoes pivotal movement only from the 2nd ratio position to the 3rd ratio position which is a depending leg of the "H" pattern, said lever being movable from any manual position to the corresponding automatic drive position without passing through the Neutral (N) position; and blocker means for preventing movement of the manual lever from the yoke of the primary carrier to the yoke of the secondary carrier except from the low ratio position.

2. A floor mounted transmission shift console for permitting selection of automatic drive ranges including Park, Reverse, Drive, Intermediate and Low in a straight-line movement and for permitting manual shifting to drive ratios including Low, 2nd and 3rd in a modified "H" pattern, said console comprising a stationary base member; a manual lever pivotally mounted on said stationary base member; primary carrier means pivotally mounted on said base member and including a yoke portion which is selectively engageable with said manual lever; transmission control cable means secured to said primary carrier for transmitting control movements to a transmission; secondary carrier means slidably mounted on the base member and including a yoke portion selectively engageable by said manual lever member; link means operatively connected between said secondary carrier and said primary carrier for transmitting and translating linear movement of said secondary carrier to pivotal movement in said primary carrier; cam means formed on said secondary carrier and operating on said link means for moving said primary carrier to the Intermediate range position when the 2nd ratio is selected by positioning the manual lever in one upstanding leg of the "H" pattern and for further moving the primary carrier to the Drive range position when 3rd ratio is selected; said lever undergoes pivotal movement only from the 2nd ratio position to the 3rd ratio position which is a depending leg of the "H" pattern, said lever being movable from any manual position to the corresponding automatic drive position without passing through the Neutral position; blocker means for preventing movement of the manual lever from the yoke of the primary carrier to the yoke of the secondary carrier except from the Low ratio position; and a park mechanism including a movement multiplying link means for preventing unauthorized shifting from Park.

3. A floor mounted transmission shift console for permitting selection of automatic drive ranges including Park, Reverse, Drive, Intermediate and Low in a straight-line movement and for permitting manual shifting to drive ratios including Low, 2nd and 3rd in a modified "H" pattern, said console comprising a stationary housing member; a manual lever pivotally mounted on said stationary housing member; primary carrier means pivotally mounted on said housing member and including a yoke portion which is selectively engageable with said manual lever; transmission control cable means secured to said primary carrier for transmitting control movements to a transmission; secondary carrier means slidably mounted on the housing member and including a yoke portion selectively engageable by said manual lever member; link means operatively connected between said secondary carrier and said primary carrier for transmitting and translating linear movement of said secondary carrier to pivotal movement in said primary carrier; cam means formed on said secondary carrier and operating on said link means for moving said primary carrier to the Intermediate range position when the 2nd ratio is selected by positioning the manual lever in one upstanding leg of the "H" pattern and for further moving the primary carrier to the Drive range position when 3rd ratio is selected; said lever undergoes pivotal movement only from the 2nd ratio position to the 3rd ratio position which is a depending leg of the "H" pattern, said lever being movable from any manual position to the corresponding automatic drive position without passing through the Neutral position; blocker means for preventing movement of the manual lever from the yoke of the primary carrier to the yoke of the secondary carrier except from the low ratio position; a detent mechanism means, including a pivotal lever, for releasably positioning the manual lever; and park/lock means including an arcuate aperture in said primary carrier means, a pin disposed in said arcuate aperture, and movement multiplying link means for positioning said pin in said arcuate aperture adjacent said pivotal lever for preventing pivoting thereof so that unauthorized movement of said manual lever from the Park range is prevented.

* * * * *